UNITED STATES PATENT OFFICE.

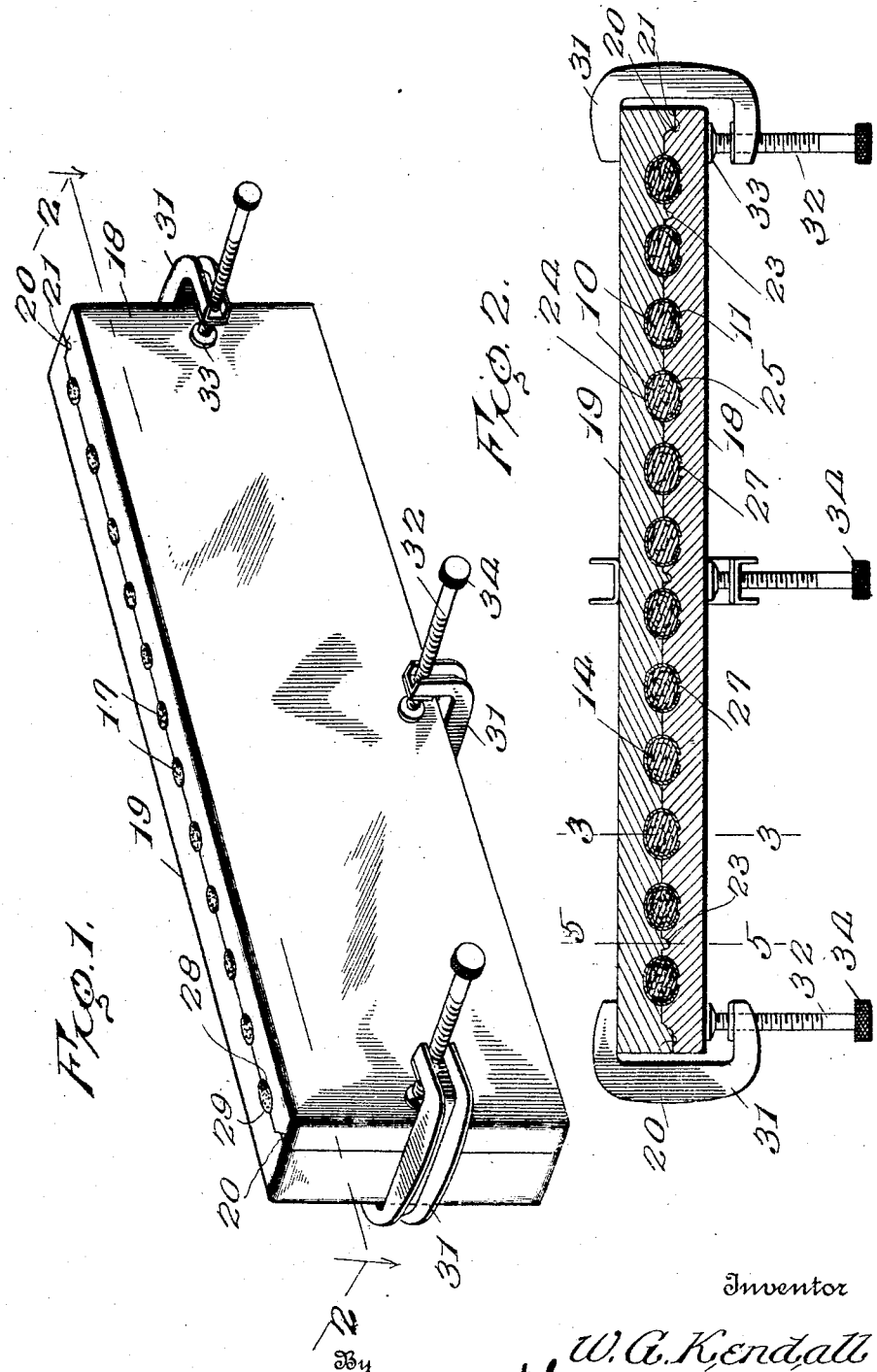

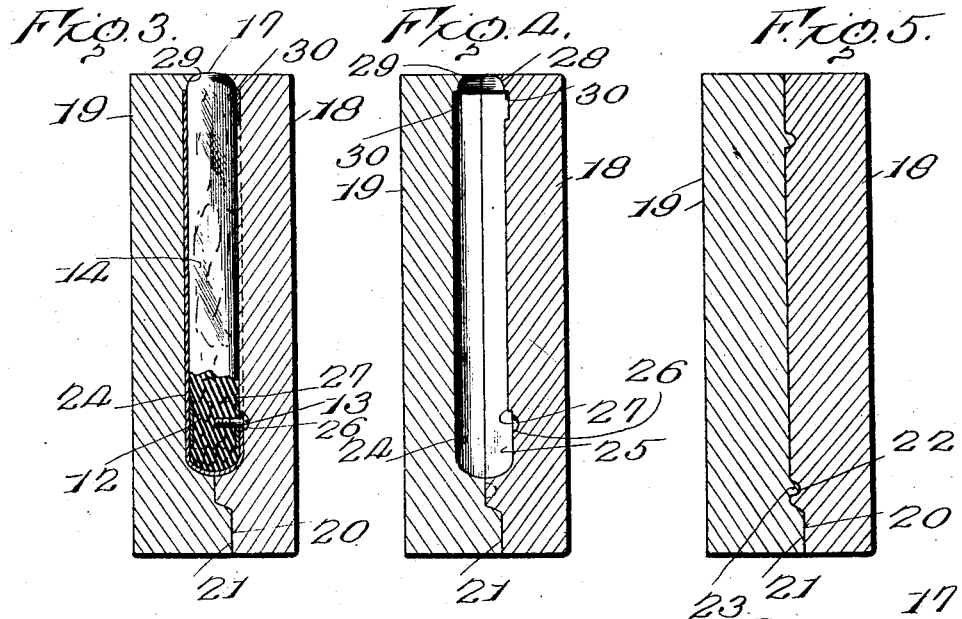
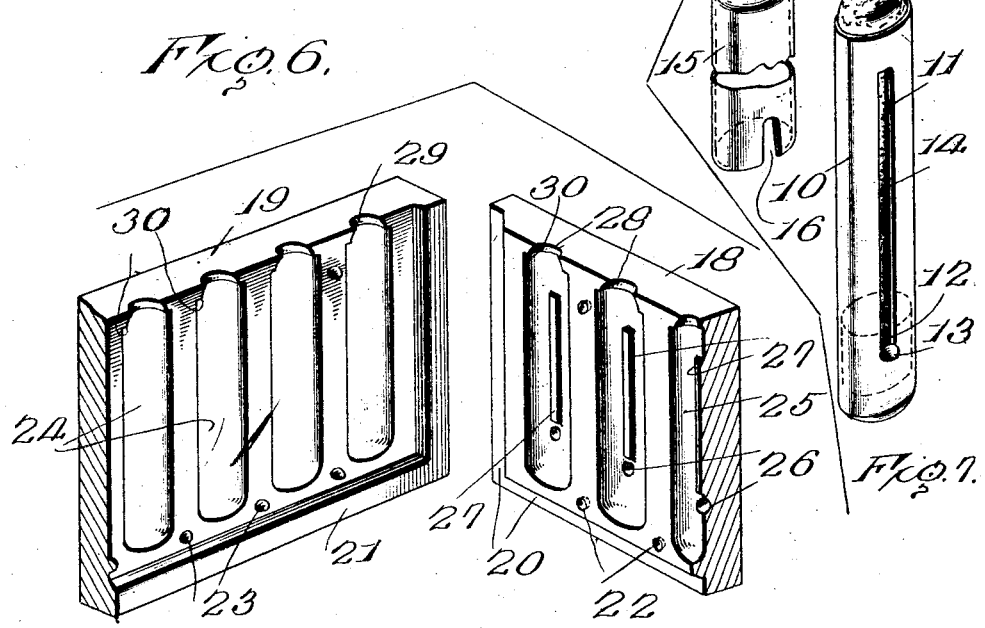

WILLIAM G. KENDALL, OF NEWARK, NEW JERSEY.

LIP-ROUGE MOLD.

1,286,651.  Specification of Letters Patent.  Patented Dec. 3, 1918.

Application filed July 17, 1917. Serial No. 181,109.

*To all whom it may concern:*

Be it known that I, WILLIAM G. KENDALL, a citizen of the United States, residing at Newark, in the county of Essex and State of New Jersey, have invented certain new and useful Improvements in Lip - Rouge Molds, of which the following is a specification.

My present invention relates to new and useful improvements in molds and more particularly to molds for forming or molding lip rouge and similar cosmetics such as eyebrow pencils and the like, and has for its primary object the provision of a mold adapted to receive the holder in which the rouge or other cosmetic is to be sold so that the stick of rouge may be molded directly in the holder.

Under existing conditions a stick of rouge of the desired size and shape is molded and is then positioned in the holder. This operation consumes considerable time and is also disadvantageous due to the fact that many of the molded sticks are destroyed in fitting them into the holders and must be remolded. The primary object of my invention, therefore, consists in constructing a mold capable of receiving a plurality of lip stick holders in such a manner that the rouge in liquid form may be poured directly into the mold and holders.

Another object of my invention is to so construct a mold that a rounded stick terminal will be formed projecting beyond the end of the holder itself ready for use.

With these and other objects in view, the invention consists in certain novel features of construction, as hereinafter shown and described and then specifically pointed out in the claims; and in the drawings illustrative of the preferred embodiment of the invention—

Figure 1 is a perspective view of a mold immediately after the rouge has been poured;

Fig. 2 is a sectional view taken on the line 2—2 of Fig. 1, looking in the direction of the arrows;

Fig. 3 is a vertical sectional view taken on the line 3—3 of Fig. 2;

Fig. 4 is a corresponding view, the holder and molded rouge however being omitted;

Fig. 5 is a sectional view taken on the line 5—5 of Fig. 2;

Fig. 6 is a fragmentary sectional view of the two mold members looking at their inner faces;

Fig. 7 is a perspective view of a rouge stick holder with its cover removed.

Corresponding and like parts are referred to in the following description and indicated in all the views of the drawings by the same reference characters.

Inasmuch as the mold forming the subject matter of my present invention is designed to receive the body portion of the holder in which the lip stick of rouge is put upon the market I will first describe the construction of the holder itself so that a clear understanding of my invention may be had. As best shown in Figs. 7 and 3 of the drawings the holder includes a tubular body 10 of sheet metal or other suitable material open at one end and closed at the other end. This body may be of any desired cross sectional shape, but is generally elliptical in cross section for more convenient manipulation. The body throughout the greater portion of its length at one side is formed with a longitudinal slot 11 terminating short of its ends. Mounted in this body is a follower in the shape of a sleeve or ferrule 12 of sheet metal corresponding in cross sectional shape to the shape of the holder and slidable therein. This follower is generally open at both ends although its inner end may be incrimped or closed, and a screw 13 is passed through the slot 11 of the holder and threaded through the sleeve so that its inner end may assist in anchoring a stick of rouge 14. The head of the screw projects beyond the slot which it overhangs and serves both as a means for moving the follower back and forth withing the holder to extend or retract the lip stick and as a means for preventing complete displacement of the follower. A tubular cap 15 corresponding in cross sectional shape to the shape of the holder and proportioned to engage about it is open at one end to receive the holder and closed at the other to protect the lip stick. The open end of the holder is preferably formed with a notch 16 to seat about the head of the screw 13 when the cap is fully in place, this notch being formed for wedging engagement with the screw so as to lock the cap in place. As shown in Fig. 7 the extending terminal of the lip stick, when placed upon the market is preferably rounded for convenience in use.

My present invention resides in the provision of a mold capable of receiving a number of the holders 10 in such a manner that rouge or other cosmetic in liquid form may be poured into the mold and flow into the holders to completely fill the holders and to provide rounded extended terminals as shown at 17 in Fig. 7. To accomplish this I provide two mold plates 18 and 19 which are preferably equal in size and rectangular in shape, being somewhat greater in height than the length of the holders to be filled. The mold plate 18 is provided in its inner face along its lower edge and ends with a sunken seat 20 and the mold plate 19 along its corresponding edges is formed with a projecting rib or shoulder 21 for engagement in the seat when the mold members are placed against each other so as to properly centralize the mold members or plates with respect to each other and hold them against lateral movement. The mold member or plate 18 is further provided adjacent it lower edge and in its inner face and adjacent its upper edge near its ends and center with substantially semi-spherical or conical depressions 22 adapted to receive similarly shaped and located studs or projections 23 formed upon the inner face of the mold plate 19. The inter-engagement of these depressions and studs serve to more accurately hold the plates in proper relative position and also prevent any vertical movement of one plate with respect to the other.

The inner face of the mold plate 19 is formed with a plurality of parallel depressions 24 of less length than the height of the plate with their ends spaced from the upper and lower ends of the plate. These depressions are rounded at their lower ends and are semi-elliptical in cross section as a rule. Of course, if the cross sectional shape of the holder to be employed is circular or of other form the depressions will be corresponding in form in their cross sectional shape. In like manner the mold plate 20 is formed with a corresponding series of similarly shaped and proportioned depressions 25 which will match with the depressions 24 when the mold plates are brought together to provide a series of parallel chambers elliptical in cross section. The depressions 25, however, are formed in spaced relation to their lower ends with extensions or seats 26 to receive the heads of the screws 13 of the holders 10 and are also formed with longitudinal ribs or shoulders 27 adapted to seat in the slots 11 of the holders and to lie flush with the inner faces of the holders.

The upper edges of the mold plates 18 and 19 are symmetrically cut-away or formed to provide with the plates assembled openings communicating with the chambers formed by the seats 24 and 25. These openings are thus provided by cutting away the plate 20 as shown at 28 and the plate 19 as shown at 29 to correspond in cross sectional shape to the shape of the chambers but to taper from their inner to their outer ends, being relatively small at their outer ends and somewhat smaller at their inner ends than the adjacent ends of the holder receiving chambers so as to provide peripheral stop shoulders 30 against which the open ends of the holders engage when they are in place. A plurality of clamping devices are preferably employed to hold the mold sections together when the mold is in use and may consist of the clamping yokes 31 and clamping screws 32 having swiveled clamping heads 33 and gnarled thumb nuts 34.

In use the bodies 10 of the holders are positioned in the depressions 25 with their open ends engaging against the shoulders 30 at the outer ends of such depressions, with their screw heads 13 engaging in the seats 26 and with the ribs or shoulders 27 of the mold plate 18 seating in the slots 11 of the holders. It will, therefore, be clear that the bodies of the holders are held in proper position within the mold plate 18. The mold plate 19 is then applied to the remainder of the mold and the two mold plates are secured by the clamps. The rouge or other cosmetic with which the holders are to be filled is then poured while in a heated liquid state into the openings in the upper edge of the mold until each of the holders is completely filled and the surface of the rouge has reached the level of the upper face of the mold. After the rouge has cooled and consequently hardened, the clamps may be removed, the mold plates separated and the filled holders containing molded sticks of rouge may be removed and their caps applied.

Obviously, by employing the above described mold a great saving both in time and of material is obtained and a more uniform shaping of the lip stick and positioning of the lip sticks in the holders is obtained.

This same type of mold may, of course, be employed in filling the cylindrical containers or holders of eyebrow pencils or in fact any holders of this character for cosmetics which may be poured while hot and which will solidify upon cooling. I do not, therefore, wish to limit myself to the specific shaping of the mold or its chambers but reserve the right to make any changes which may fall within the scope of the appended claims.

Having thus described the invention, what is claimed as new is:

1. In a mold for molding a cosmetic in a holder which holder is in the nature of a shell open at one end and provided in one side with a longitudinally extending slot, the mold structure which includes mold sections provided in their meeting faces with matching recesses providing a mold chamber opening at one end through the adjacent side of the mold to provide a filling opening, the walls of the recesses being provided with matching shoulders to provide an abutment for the edge of the wall of the shell at the open end thereof, and the wall of one of the recesses being formed with a longitudinally and inwardly extending shallow rib designed to extend into the slot in the said shell when the shell is placed in the mold chamber.

2. In a mold for molding a cosmetic in a holder which holder is in the nature of a shell open at one end, the mold structure which includes mold sections provided in their meeting faces with matching recesses providing a mold chamber opening at one end through the adjacent side of the mold to provide a filling opening, the recesses being reduced near the open end of the chamber to approximately conoidal form to provide inwardly projecting circumferentially extending shoulders for the engagement thereagainst of the edge of the wall of the shell at its open end.

3. In a mold for molding a cosmetic in a holder which holder is in the nature of a shell open at one end and provided in one side with a longitudinally extending slot, the mold structure which includes mold sections provided in their meeting faces with matching recesses providing a mold chamber opening at one end through the adjacent side of the mold to provide a filling opening, the wall of one of the recesses being formed with a longitudinally and inwardly extending shallow rib adapted to fill the slot in the said shell when the shell is disposed within the said mold chamber.

4. In a mold for molding a cosmetic in a holder which holder is in the nature of a shell open at one end and provided in one side with a longitudinally extending slot and which holder further embodies an ejector element movable longitudinally in the said slot and projecting beyond the outer face of the said wall, the mold structure which includes mold sections provided in their meeting faces with matching recesses providing a mold chamber opening at one end through the adjacent side of the mold to provide a filling opening, the wall of the chamber having a longitudinally extending shallow rib to seat within and fill the slot within the holder shell when the shell is disposed within the mold chamber, the said wall of the mold chamber being further provided in proximity to one end of the rib with a recess to receive the ejector element of the said holder.

In testimony whereof I affix my signature.

WILLIAM G. KENDALL. [L. S.]

Copies of this patent may be obtained for five cents each, by addressing the "Commissioner of Patents, Washington, D. C."